Dec. 12, 1961     D. HORVITZ ET AL     3,012,948
DEHYDRATION OF METHYLHYDRAZINE
Filed March 26, 1959
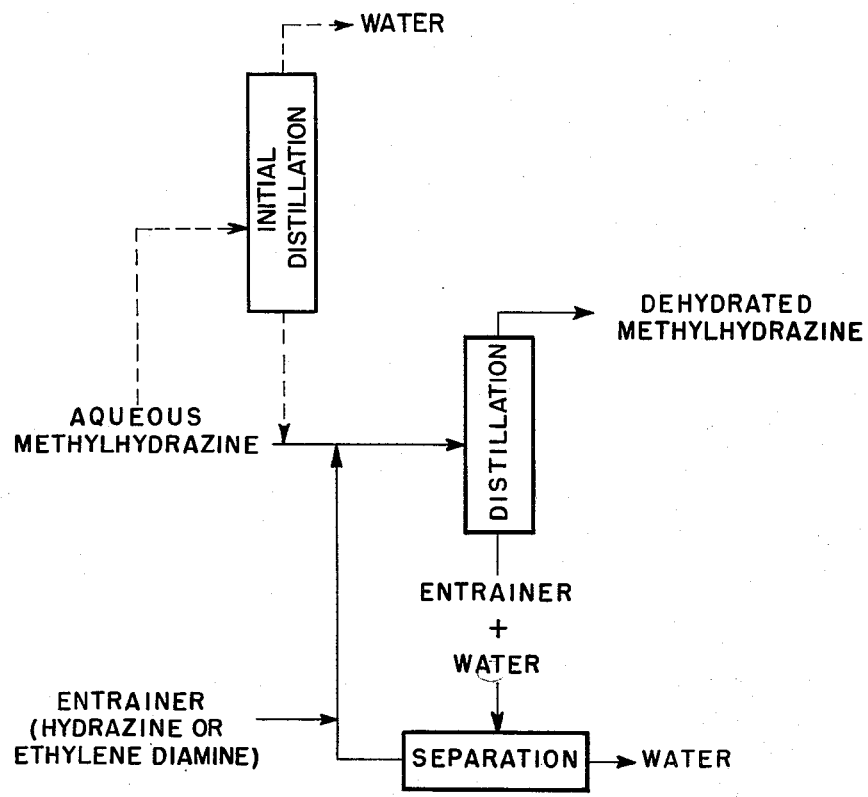
DAVID HORVITZ
& AMOS H. POPE
*INVENTORS*
BY Lawrence Rosen
ATTORNEY 3,012,948
DEHYDRATION OF METHYLHYDRAZINE
David Horvitz, Cincinnati, Ohio, and Amos H. Pope, Avondale, Md., assignors to National Distillers and Chemical Corporation, New York, N.Y., a corporation of Virginia
Filed Mar. 26, 1959, Ser. No. 801,987
10 Claims. (Cl. 202—42)

This invention relates to a novel process for the dehydration of methylhydrazine, and more particularly for the production of anhydrous methylhydrazine.

Methylhydrazine is useful both as an ingredient of high-energy fuels and as an intermediate in the synthesis of pharmaceuticals, dyes, and other commercial organic products. As a rocket propellant it can be used either alone or in combination with known oxidizers such as nitric acid with which it is hypergolic. Such applications are only possible and/or economically feasible after most or all of the water has been removed from the methylhydrazine.

For the purpose of this invention, anhydrous methylhydrazine refers to methylhydrazine 100% free of water, while methylhydrazine and water solutions are defined as also including methylhydrazine and water mixtures.

Methods of manufacturing methylhydrazine frequently result in the production of dilute aqueous solutions of the compound from which a more highly concentrated solution, or an essentially anhydrous one, must be obtained. Although methylhydrazine boils at 87°–88° C., it cannot be fractionally distilled from water, because it has been found that methylhydrazine forms a maximum boiling azeotrope with water. This azeotrope boils at about 105.2° C. and contains about 47.3% methylhydrazine by weight. Therefore, on attempting to distill fractionally from an aqueous solution containing less than 47.3% of methylhydrazine by weight, the first substance that comes off is water. Theoretically it is possible, therefore, to enrich the methylhydrazine content up to a maximum of about 47%. Because of the small difference in boiling points of water and of the methylhydrazine-water azeotrope, however, it is difficult to effect enrichment beyond about 40–45%. If an aqueous solution contains a greater amount of methylhydrazine than 47.3%, it is possible to distill off dehydrated methylhydrazine until the concentration of the solution has declined to the composition of its azeotrope. Further purification cannot then be achieved by ordinary distillation.

It has now been found that methylhydrazine can be distilled as a anhydrous or dehydrated substance from its aqueous solution in any concentration by the addition of an appropriate quantity of an entrainer such as ethylene diamine or hydrazine, which forms an azeotrope with the water. Thus, if either ethylene diamine or hydrazine is added to an aqueous solution of methylhydrazine in such a quantity that its concentration relative to the water present is at least at great as it would be in its natural azeotropic composition with water, the methylhydrazine can be fractionally distilled as the anhydrous substance leaving behind the higher boiling azeotrope of water with ethylene diamine or hydrazine.

Hydrazine forms an azeotrope with water which boils at about 120° C. and contains about 30% by weight of water. Ethylene diamine, on the other hand, forms an azeotrope with water which boils at about 118° C. and contains about 25% by weight of water. Consequently, to produce anhydrous methylhydrazine a quantity of hydrazine must be added to the methylhydrazine-water solution to bring the percentage of water based on water plus hydrazine to 30% or less. In other words, at least 7 parts of hydrazine must be added for each 3 parts of water in the resulting mixture. Similarly, to produce anhydrous methylhydrazine using ethylene diamine, at least 3 parts of ethylene diamine must be added for each part of water in the resulting mixture.

In order to produce anhydrous methylhydrazine from a solution containing 40 g. of methylhydrazine and 60 g. of water, for example, 140 g. of anhydrous hydrazine is added and then the resulting mixture distilled in a fractionating column. The concentration of hydrazine with respect to the water present (not including the methylhydrazine) is 70% by weight, which corresponds to the composition of the hydrazine-water azeotrope. On fractional distillation, all of the methylhydrazine distills first as a pure material, and the hydrazine and water stay in the bottom of the distillation flask. If lesser amounts of hydrazine are added, the amount of anhydrous methylhydrazine that will be obtained by fractional distillation will be proportionately less. If greater amounts of hydrazine are added, the excess hydrazine will simply be retained in the bottoms with the hydrazine-water azeotropic composition. These same considerations apply to the use of ethylene diamine.

This procedure may be applied to methylhydrazine-water solutions of any concentration, but for economic reasons it is preferable to concentrate the solution of methylhydrazine as far as possible by direct distillation prior to the addition of the ethylene diamine or hydrazine. It is possible to employ continuous distillation procedures as well as batch operations, in practicing the method of this invention the basic principle being unaffected by the manner of distillation. Similarly, distillations at sub-atmospheric or super-atmospheric pressures may be conducted successfully, the only change in either case being to alter to a small degree the relative compositions of the azeotropes. This change is small unless very high pressures are used. It is not advisable, therefore, to exceed two or three atmospheres in distillations involving methylhydrazine or hydrazine because overheating their vapors may cause detonations.

The hydrazine or ethylene diamine employed in this procedure acquires the water originally held by the methylhydrazine. Part or all of this water can be removed from the compound by any of the several procedures known to the art. See U.S. Patent No. 2,698,286, issued December 28, 1954. The dehydrated or partially dehydrated compound is then recycled to the aqueous methylhydrazine feed solution.

The dehydration procedure of this invention is illustrated by the accompanying drawing. The aqueous methylhydrazine together with the entrainer, hydrazine or ethylene diamine, is fed into a conventional distillation column. Dehydrated methylhydrazine is recovered overhead, and a mixture of the entrainer and water is removed below. The water is then removed from the entrainer, and the entrainer is recycled to the aqueous methylhydrazine feed.

As shown in the drawing, the acqueous methylhydrazine feed may be subjected to an initial distillation treatment to remove excess water overhead and to recover a concentrated aqueous methylhydrazine feed solution.

This invention is further illustrated by the following examples, although it is not intended to limit the invention specifically thereto. All parts are by weight unless otherwise specified.

*Example 1*

To a solution containing 40 parts of methylhydrazine and 60 parts of water were added 350 parts of 95% ethylene diamine (5% water). This solution was then fractionally distilled through a column packed with glass helices. A first cut of 34 parts taken off between 86.5° and 88.0° C. was analyzed by titration with potassium iodate and found to be 99.8% pure methylhydrazine.

Another cut of 5 parts came off as the vapor temperature rose rapidly to 116.8° C. This cut was found to contain 73.7% by weight of methylhydrazine. A third cut of 7 parts taken between 116.8° and 118° C. contained 36.2% by weight of methylhydrazine. The residue in the pot was found to contain no methylhydrazine.

The three cuts, therefore, represent a complete recovery of methylhydrazine. The center cuts, of course, contain a mixture of methylhydrazine and ethylene diamine. In batch distillations the center cuts can be reintroduced in a new batch. In continuous distillation the center cuts would not appear.

*Example II*

To a solution containing 40 parts of methylhydrazine and 60 parts of water were added 140 parts of substantially anhydrous hydrazine (contains 1% water). This solution was fractionally distilled in a packed column. The first cut from 86° to 88° C. comprised 33 parts of 100% anhydrous methylhydrazine. A center cut taken up to 120° C. contained the remainder of methylhydrazine along with some hydrazine. The pot residue analyzed 69.7% hydrazine.

The above data show the effectiveness of the method of this invention for effecting the dehydration of methylhydrazine. It will be understood, of course, that while particular embodiments of this invention are shown above, the invention is obviously subject to variance and modification without departing from its broader aspects.

What is claimed is:

1. A method for dehydrating methylhydrazine which comprises distilling an aqueous methylhydrazine solution in the presence of an entrainer selected from the group consisting of hydrazine and ethylene diamine, and recovering dehydrated methylhydrazine.

2. The method of claim 1 wherein said entrainer is hydrazine.

3. The method of claim 1 wherein said entrainer is ethylene diamine.

4. The method of claim 1 wherein said entrainer is employed in an amount at least sufficient to form an azeotrope with all water present in the resulting admixture.

5. The method of claim 4 wherein at least 7 parts by weight of hydrazine are employed for 3 parts by weight of water.

6. The method of claim 4 wherein at least 3 parts by weight of ethylene diamine are employed for each part by weight of water.

7. The method of claim 1 wherein said aqueous mixture is initially subjected to distillation, prior to distillation in the presence of an entrainer, until the methylhydrazine begins to azeotrope with the water.

8. A continuous process for dehydrating methylhydrazine which comprises distilling an aqueous mixture of methylhydrazine in the presence of an entrainer selected from the group consisting of hydrazine and ethylene diamine in a fractional distillation zone, removing from the upper portion of said zone dehydrated methylhydrazine, removing from the bottom portion of said zone a solution comprising said entrainer and water, separating water from said entrainer, and recycling the resulting substantially dehydrated entrainer to said distillation zone.

9. The process of claim 8 wherein said entrainer is hydrazine.

10. The process of claim 8 wherein said entrainer is ethylene diamine.

References Cited in the file of this patent

Azeotropic Data, Horsley (copyright 1952), American Chemical Society, page 6 relied upon.